United States Patent [19]

Dureau et al.

[11] 3,740,746

[45] June 19, 1973

[54] MAGNETIC KEYBOARD

[75] Inventors: Gabriel Dureau, Le Perreux; Leon Roche, Chatillon-sous-Bagneux; Marcel Villain, Fresnes, all of France

[73] Assignee: Compagnie Industrielle Des Telecommunications Cit-Alcatel, Paris, France

[22] Filed: Nov. 30, 1971

[21] Appl. No.: 203,228

[30] Foreign Application Priority Data

Nov. 30, 1970 France .............................. 7043007

[52] U.S. Cl. ............ 340/365 L, 178/17 C, 197/98, 340/174 EC

[51] Int. Cl. ............................................ H04q 3/00

[58] Field of Search .................... 340/365, 174 EC, 340/173 SP; 179/90 K; 197/98; 178/17 R, 17 C

[56] References Cited

UNITED STATES PATENTS

| | | | |
|---|---|---|---|
| 3,623,080 | 11/1971 | Scarbrough | 340/365 |
| 3,623,081 | 11/1971 | Scarbrough | 340/365 |
| 3,644,893 | 2/1972 | Harwood | 340/166 |
| 3,219,984 | 10/1965 | Bingham et al. | 340/173 SP |
| 3,102,999 | 9/1963 | Bernemyr et al. | 340/174 EC |

*Primary Examiner*—John W. Caldwell
*Assistant Examiner*—Robert J. Mooney
*Attorney*—Richard C. Sughrue, Gideon Franklin Rothwell, John H. Mion et al.

[57] ABSTRACT

Magnetic keyboard transforms the depression of a key to electric signals corresponding to a numerical code, comprising circuits having superimposed coils, magnetically decoupled by a conductive disc placed in the immediate vicinity of the primary circuit. The depression of a key moves the conductive disc away and couples the secondary coil to the primary coil.

12 Claims, 3 Drawing Figures

MAGNETIC KEYBOARD

BACKGROUND OF THE INVENTION

1. Field of the Invention

The present invention concerns a magnetic keyboard transforming the depression of a key into signals corresponding to a digital code.

2. Description of the Prior Art

There exist numerous devices implementing keyboards, receiving data in plain language and recording it in coded form, in which each key is connected with a coding circuit.

In these devices the coding circuit associated with each key generally consists of a transformer comprising a primary coil and N secondary coils wound round a magnetic circuit.

The output signals are obtained at the output of N dipoles each obtained by the coupling in series of the secondary coils of the transformers at a rate of one secondary coil per transformer. According to the flow direction of the current in a given coil, a "1" or an "0" is obtained at the output of the corresponding dipole, when the corresponding key is pressed down.

To change codes in these devices, it is necessary to unsolder a certain number of secondary turns of a dipole and to re-solder them, inverting the output and the input of the coils.

In order to enable a much easier change of code and the use of simple printed circuits, the applicant has used, in the magnetic keyboard of the invention circuits comprising a primary coil and a secondary coil arranged face to face on an insulating support and a decoupling means consisting of a conductive disc placed in the immediate vicinity of the primary coil. When using a conductive disc, a pulse flowing through a primary coil induces only a weak signal in the superimposed secondary coil. On the contrary, if the disc is moved away, the induced signal in the secondary coil becomes much greater. Circuits of this type are more particularly implemented by the applicant in U.S. Pat. application Ser. No. 59,260 filed July 29, 1970.

SUMMARY OF THE INVENTION

The object of the invention is a magnetic keyboard for data insertion in digital systems in the form of a code having N digits, said keyboard comprising M keys associated with coding means, which is characterized in that these coding means comprise:

M keyboard transformers, one per key, each consisting of a primary coil and of a secondary coil arranged face to face on an insulating support, and of a decoupling means;

a coding matric having N + 1 lines and M columns comprising M × (N + 1) coding transformers each consisting of a primary coil and of a secondary coil arranged face to face on an insulating support;

a coding layer acting upon the said coding matrix;

a voltage supply feeding the primary coils of the M keyboard transformers connected up in series.

And in that the second turn of each of the M keyboard transformers is connected to the input of one of the M columns of the coding matrix consisting of N + 1 primary coils of N + 1 coding transformers connected in series.

The fact that the secondary turn of each keyboard transformer forms, with the N + 1 primary coils of the corresponding coding matrix, a single circuit leads to a very great technological advantage. All these circuits can be printed directly onto a same insulating film. The primary circuits of the keyboard transformers and the secondary circuits of the coding transformers are printed on a second film. The operation can be carried out on both the faces of a same insulating film. Thus, therefore, very accurate devices which are very easily reproduced, having low cost and enabling a high amplitude signal to be obtained if the feeding of the primary coils of the keyboard transformer is effected starting from a sufficiently powerful source, are produced.

Another advantage of the device results from the fact that when the device is thus produced, by superimposing the two layers of printed circuits, it is still possible to effect any coding. For that purpose, the two layers of coils of the coding matrix, placed facing each other, are covered with a coding layer consisting of metallic de-coupling discs. The lack of a disc above a coupling transformer formed by a primary coil and another secondary coil corresponds to a coupling, hence to the presence of a signal "one", whereas the presence of a disc de-couples the two coils. The coding matrix comprises as many output wires as there are bits used.

The invention will be better understood on referring to the following description of an embodiment given by way of a non-limiting example with reference to the accompany drawings.

DESCRIPTION OF THE PREFERRED EMBODIMENT

Figure 1:
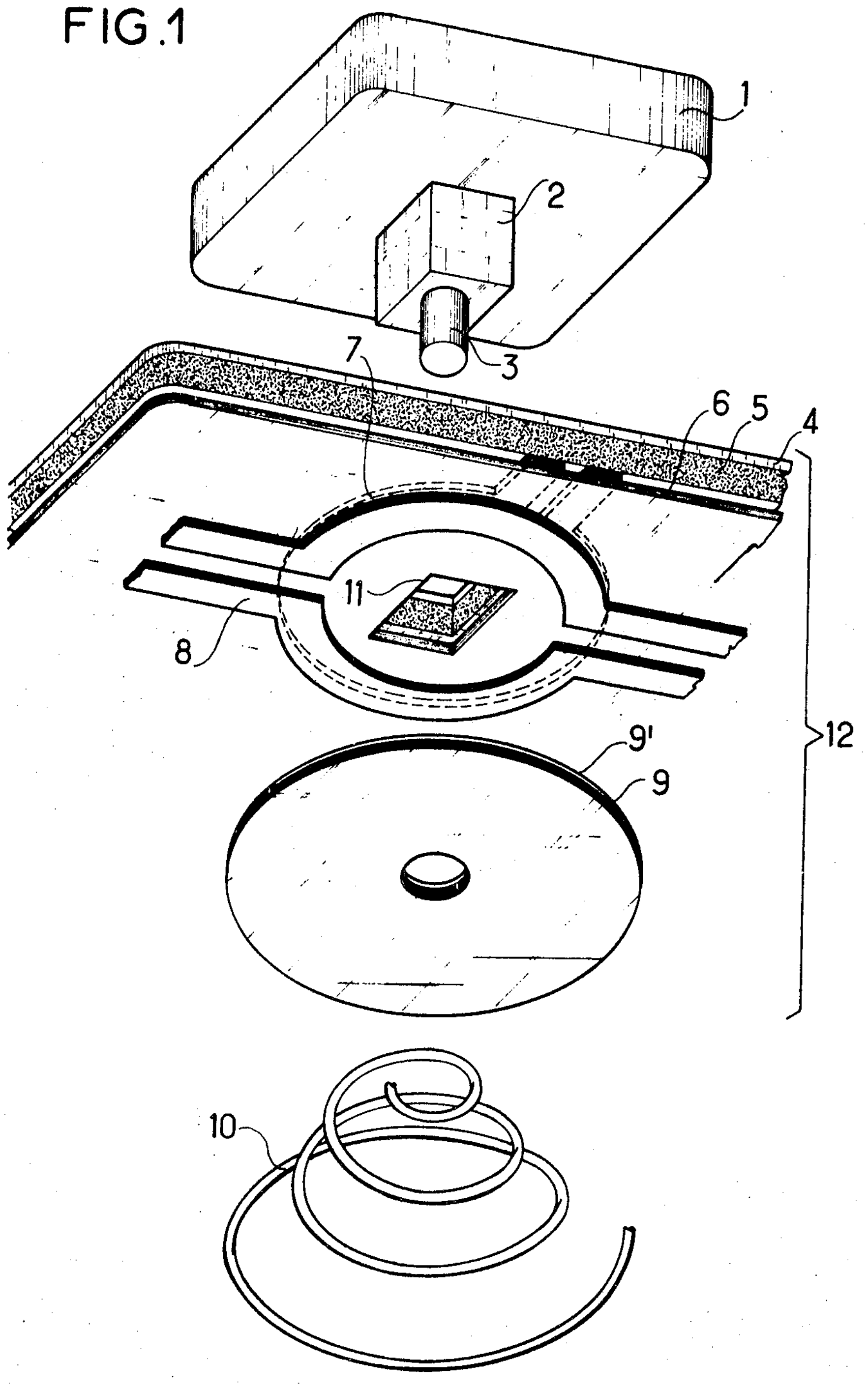
FIG. 1 is an exploded perspective diagram showing the assembly principle of a magnetic keyboard key associated with a keyboard transformer.

FIG. 1 shows diagrammatically an embodiment of a key showing better the way in which it induces a current in the secondary coil of a keyboard transformer.

A key 1 is made of molded insulating material extended at its base by a parallelepiped 2 also made of molded insulating material, onto whose base is fixed a cylindrical end part 3 molded at the same time as the key and the parallelepiped. The keyboard transformer 12 facing the key comprises successively, from top to bottom, a plastic support 4, a permeable magnetic material 5, (ferrite, or, preferably, a pliant magnetic material), a film 6 supporting a secondary coil 7. A primary coil 8 fed by an alternating voltage source or impulse voltage source having an equal frequency, in several of the inventors' embodiments, at 1 mc/s, is arranged on the other face of the film 6, or on a second insulating film. Then, there is a conductive disc 9 electrically insulated from the primary coil by a thin insulating layer 9'. The conductive disc 9 is applied against the primary turn 8 by the action of a return spring 10.

When the key 1 is not depressed, the return spring 10 keeps the disc in contact with the primary coil 8 through a thin insulating layer. Only a negligible electromotive force is set up in the coil 7, for the transformation ratio between the two turns 8 and 7 is in the order of nil.

When the key is depressed, the parallelepiped 2 made of insulating material slides in the opening 11 made in the support of the keyboard transformer and pushes the conductive disc 9 back. Under the action of the magnetic field of the primary coil 8, an electromotive force giving, in the secondary circuit, a signal having the same frequency as the source is set up in the secondary coil 7.

Figure 2:
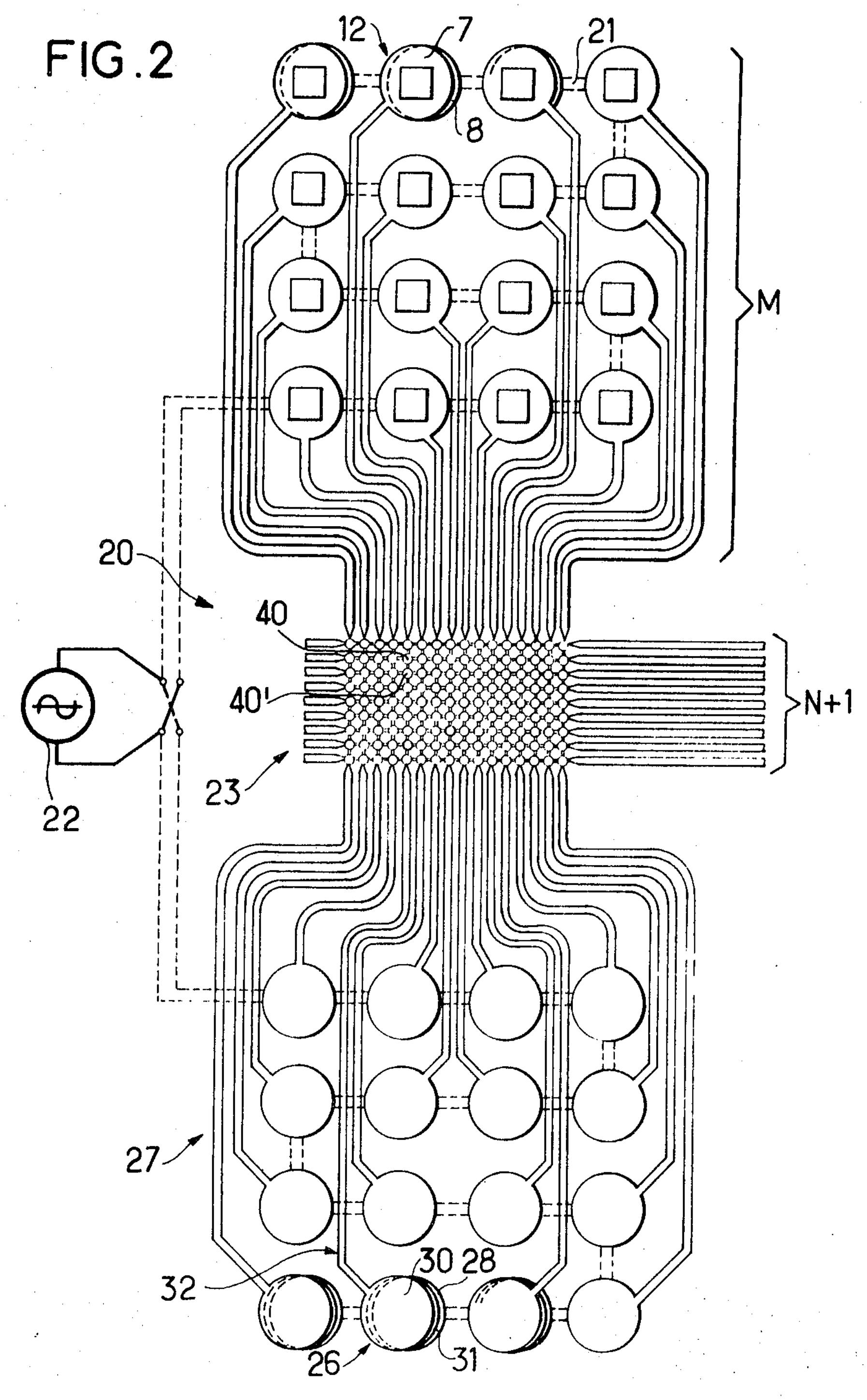
FIG. 2 is a schematic view of the assembly of a key comprising M keys.

FIG. 2 shows the keyboard 20 according to the invention.

This keyboard 20 comprises M keyboard transformers 12, associated with M keys (not shown) such as 1 and described in greater detail in FIG. 1.

The M primary turns 8 of the keyboard transformers 12 are connected in series and form a circuit 21 fed by an alternative voltage or impulse voltage source 22.

The keyboard 20 also comprises a coding matrix 23 having (N + 1) lines and M columns.

This coding matric 23 comprises (N + 1) × M coding transformers such as 40 or 40'.

Figure 3:
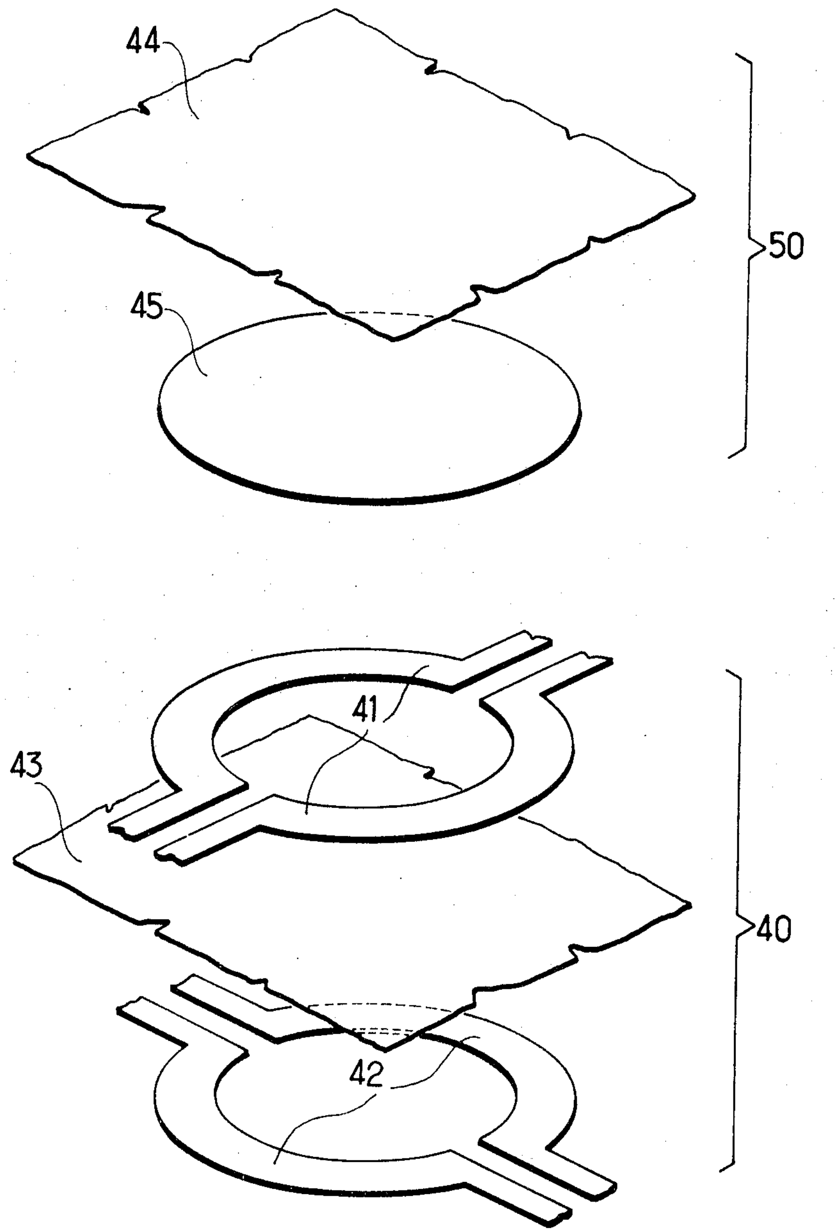
FIG. 3 is an exploded, perspective schematic view of a coding transformer and a part of the coding layer.

Such a coding transformer has been shown in greater detail in FIG. 3.

The transformer 40 comprises a primary coil 41 and a secondary coil 42 arranged on both sides of an insulating film 43.

On examining FIG. 2 again, it can be seen that the secondary coil 7 of a keyboard transformer 12 is connected to the N + 1 primary coils 41 of N + 1 coding transformers 40 forming one of the M columns of the coding matrix 23.

The secondary coils 42 of the coding transformers 40 are series connected in order to form N + 1 lines at whose output the N-digit coded signals accompanied by a parity signal are obtained.

In FIG. 2, the example taken is M = 16 and N = 8.

It has been seen that the applying of the conductive disc 9 to the primary circuit 8 of the keyboard transformer 12 did not prevent the existence of a negligible electromotive force within the secondary coils. For greater certainity, to avoid any extraneous influence, and in order to be able to implement alternating sources 22 of very low voltage, the inventors have considered it preferable in certain cases, to associate M compensation transformers 26 forming a dummy keyboard 27 identical, from the electrical point of view, with the active keyboard. Each transformer 26 of the dummy keyboard is provided with a conductive disc 28 thus simulating a key at rest.

Each compensation transformer 26 of the dummy keyboard 27 corresponds to a keyboard transformer 12. These two corresponding transformers 12 and 26 are connected to the two ends of the same column of the coding matrix 23.

The secondary coil 8 of the transformer 12, the primary coils forming the said column, the secondary coil 30 of the corresponding compensation transformer 26, constitute a single circuit 32 printed on the same insulating film 43.

The result is that, between these various coils, there is no soldering, this playing a considerable part in simplifying from the technological point of view.

The secondary coils 8 of the keyboard transformers 12, the primary coils 41 of the coding matrix 23 and, possibly, the secondary coils 30 of the compensation transformers 26, if they exist, are printed on one surface of the same insulating film 43.

The primary coils 7 of the keyboard transformers 12, as well as the secondary coils 42 of the coding matrix 23, and, possibly, the primary coils 31 of the compensation transformers, if they exist, are printed on the other face.

Coding is effected by coupling or by decoupling the various coding transformers 40 by means of a coding layer 50 consisting of an insulating film 44 (FIG. 3) on which copper discs 45 (FIG. 3) are printed. Each coding layer 50 is in the form of a matrix comprising M × N positions capable of receiving discs 45.

Therefore, it is sufficient to apply a certain coding layer provided with the appropriate copper discs in order to obtain any required coding.

Thus, if it is assumed that in one of the M columns of the coding matrix 23, only the transformers 40 and 40' are deprived of the copper disc, on pressing down the key associated with the keyboard transformer 12 corresponding to the said column, an 8-digit signal, 01100000 followed by a parity signal will be obtained at the output. If this layer is substituted by another coding layer, provided, on the contrary, with two conductive discs facing the transformers 40 and 40', it will easily be understood that the 8-digit signal obtained by pressing down the same key will be 10011111. Hence, a simple substitution of a coding layer applied on the coding matrix enables the keyboard to be adapted to another function with another coding system.

The input and output of the circuits described above can be connected without any disadvantage to any other electronic circuit, for example, to integrated circuits.

Such a device has been implemented for the production of keyboards such as typewriter keyboards, telephone dialing keyboards, data input keyboards on computers, adding machine keyboards, hexadecimal keyboards, digital controls for machine-tools and other control desk equipment.

The example of an embodiment described above shows the simplicity of such an embodiment. The great ease with which the coding system used is modified at any moment, this facilitating the adapting of that keyboard to the most varied equipment, has been shown in this example.

The reliability of such a keyboard is also excellent, because of the removal of all the mechanical contacts and of all the solderings, as well as the irresponsiveness of such a device to environment and temperature.

Lastly, the input and the outputs of such a device can also be produced without soldering. Thus, each input or output circuit ends with a loop, and the outer circuit of the keyboard circuit is coupled very simply by induction to the keyboard circuit.

Such a loop can be printed at the same time as the secondary coils of the coding transformers on the same insulating support.

What is claimed is:

1. In a magnetic keyboard for the input in digital systems of data in the form of a code having N digits said keyboard comprising M keys and associated coding means, the improvement wherein said coding means comprise:

M keyboard transformers, one per key, each consisting of a primary coil and of a secondary coil arranged face to face on an insulating support and a decoupling means;

a coding matrix having N + 1 lines and M columns comprising (M × N + 1) coding transformers each consisting of a primary coil and a secondary coil arranged face to face on an insulating support;

a coding layer acting upon said coding matrix;

a voltage supply feeding the primary coils of the M keyboard transformers; and means connecting said primary coils of the M keyboard transformers in series and means connecting the secondary coil of each of the M keyboard transformers to the input of one of the M columns of the coding matrix consisting of the N + 1 primary coils of (N + 1) coding transformers connected in series.

2. The magnetic keyboard according to claim 1, wherein the decoupling means consists of a conductive disc spring biased against the primary coil but electrically insulated from the latter by a thin insulating film.

3. The magnetic keyboard according to claim 1, wherein the coding layer acting upon the coding matrix consists of an insulating film applied on the said coding matrix and bearing, opposite each coding transformer to be decoupled, a disc made of conductive material having substantially the same diameter as the primary coil.

4. The magnetic keyboard according to claim 2, wherein the coding layer acting upon the coding matrix consists of an insulating film applied on the said coding matrix and bearing, opposite each coding transformer to be decoupled, a disc made of conductive material having substantially the same diameter as the primary coil.

5. The magnetic keyboard according to claim 1, further comprising a dummy compensation keyboard identical, from the electrical point of view, with the magnetic active keyboard, in which each keyboard transformer is provided with a conductive disc simulating a key at rest.

6. The magnetic keyboard according to claim 2, further comprising a dummy compensation keyboard identical, from the electrical point of view, with the magnetic active keyboard, in which each keyboard transformer is provided with a conductive disc simulating a key at rest.

7. The mangetic keyboard according to claim 3, further comprising a dummy compensation keyboard identical, from the electrical point of view, with the magnetic active keyboard, in which each keyboard transformer is provided with a conductive disc simulating a key at rest.

8. The magnetic keyboard according to claim 1, wherein each secondary turn of each keyboard transformer, the N + 1 series connected primary coils of the coding matrix corresponding thereto form a single circuit on an insulating film.

9. The magnetic keyboard according to claim 2, wherein each secondary turn of each keyboard transformer, the N + 1 series connected primary coils of the coding matrix corresponding thereto form a single circuit on an insulating film.

10. The magnetic keyboard according to claim 3, wherein each secondary turn of each keyboard transformer, the N + 1 series connected primary coils of the coding matrix corresponding thereto form a single circuit on an insulating film.

11. The magnetic keyboard according to claim 5, wherein each secondary turn of each keyboard transformer, the N + 1 series connected primary coils of the coding matrix corresponding thereto and the secondary coil which is the element corresponding to the dummy keyboard, if there exists one, form a single circuit on an insulating film.

12. The magnetic keyboard according to claim 8, wherein each of the said circuits is deposited on the same insulating film.

* * * * *